United States Patent [19]

Takagi et al.

[11] Patent Number: 5,006,879
[45] Date of Patent: Apr. 9, 1991

[54] ELECTRONIC FLASH LIGHTING DEVICE FOR CAMERA

[75] Inventors: Tadao Takagi, Yokohama; Toshihiro Sato, Tokyo, both of Japan

[73] Assignee: Nikon Corporation, Tokyo, Japan

[21] Appl. No.: 410,659

[22] Filed: Sep. 21, 1989

[30] Foreign Application Priority Data

Sep. 26, 1988 [JP] Japan .................................. 63-238976

[51] Int. Cl.$^5$ .............................................. G03B 7/00
[52] U.S. Cl. ...................................... 354/413; 354/416
[58] Field of Search ................ 354/413, 416, 417, 432

[56] References Cited
U.S. PATENT DOCUMENTS 4,705,382 11/1987 Mukai et al. .......................... 354/416

Primary Examiner—L. T. Hix
Assistant Examiner—David M. Gray
Attorney, Agent, or Firm—Shapiro and Shapiro

[57] ABSTRACT

An electronic flash lighting device for a camera comprises a first light measuring device for measuring the brightness of a field to be photographed, prior to flash emission, and a second light measuring device for measuring the brightness of a plurality of divided areas of the field during flash emission and producing a corresponding plurality of signals. These signals are weighted in accordance with the measurement performed by the first light measuring device, and the flash emission is stopped in accordance with the weighted signals.

14 Claims, 5 Drawing Sheets

1

ELECTRONIC FLASH LIGHTING DEVICE FOR CAMERA

BACKGROUND OF THE INVENTION

1. Field of the Invention

The present invention relates to an electronic flash lighting device, more particularly to an electronic flash lighting device with automatic light control and capable of synchronized photography.

2. Related Background Art

In a prior art electronic flash lighting device with automatic light control, flash light reflected from an object is measured and integrated, and when its integration value reaches a predetermined value, light emission from the electronic flash lighting device is automatically stopped.

Conventionally, the following two methods of light measurement have been employed: (1) an averaged light measuring method that measures an average brightness of an entire field, and (2) a center-weighted measuring method that measures mainly the central part of the field. When automatic light control is used with an averaged light measuring method, if a very bright object, such as the sun, for example, is within the field, a nearby main subject tends to be underexposed. The center-weighted light measuring method presents no such problems. However, a main subject in a peripheral portion of the field tends to be overexposed because little light is reflected from the center of the field.

SUMMARY OF THE INVENTION

An object of the present invention is to solve the foregoing problems and to provide an electronic flash device with automatic light control in which the composition or background of the field has little influence on the exposure, so that proper exposure is obtained more consistently.

In the attainment of the foregoing object of the invention, an electronic flash lighting device having flash producing means to produce a flash emission for lighting a field to be photographed comprises:

first light measuring means for measuring the brightness of the field at a non-flash-emission time of said flash producing means and outputting a corresponding first light measurement output;

second light measuring means for measuring the brightness of a plurality of divided areas of the field during flash emission of said flash producing means and outputting a plurality of corresponding second light measurement signals;

determining means for determining weights for said plurality of second light measurement signals in accordance with said first light measurement output prior to the start of flash emission of said flash producing means;

weighting means for weighting said plurality of second light measurement signals in accordance with the weights determined by said determining means; and flash control means for controlling the stopping of flash emission of said flash producing means in accordance with the plurality of weighted second light measurement signals.

By virtue of the invention, proper exposures are obtained without undue influence of particular portions of a field to be photographed. Flash control is subject to the weight of a plurality of divided light measuring regions. Furthermore, the degree of weighting is determined prior to the start of light emission of the flash device, thereby giving a sufficient time for the determination of proper weighting.

Other objects, features and advantages of the invention will become more apparent from a detailed description based on the accompanying drawings.

BRIEF DESCRIPTION

FIG. 2.

DESCRIPTION OF THE PREFERRED EMBODIMENTS

An embodiment of the invention will be described below on the basis of the accompanying drawings.

Figure 1:
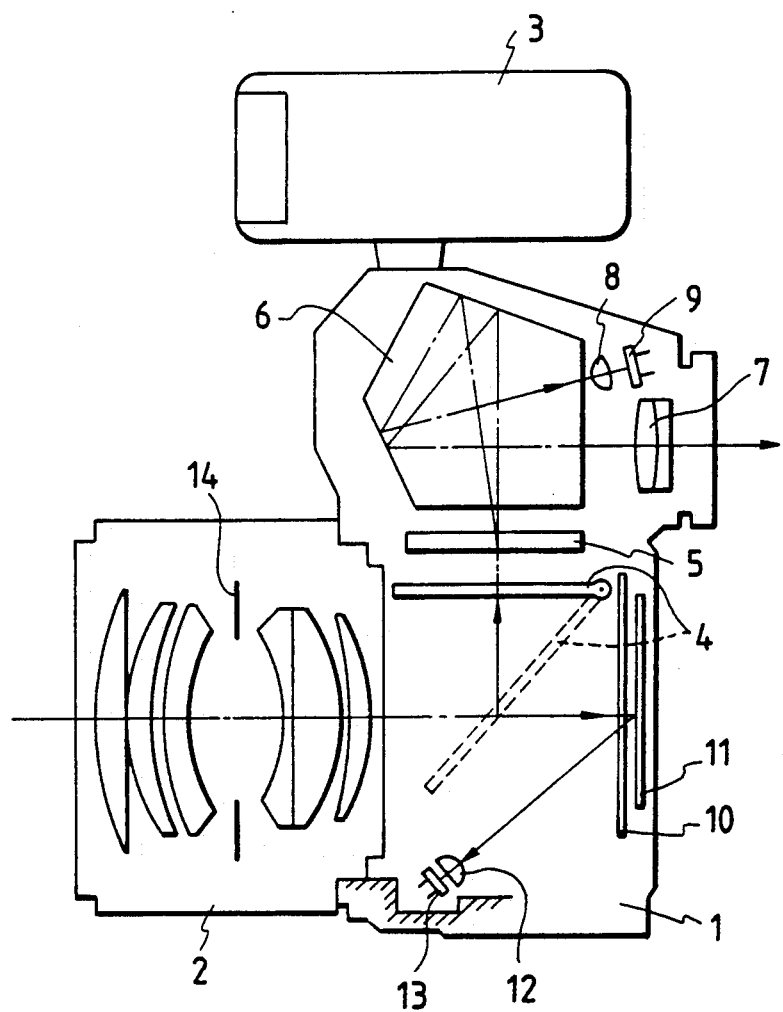
FIG. 1 is a cross section illustrating a diagrammatic arrangement of a single-lens reflex camera incorporating a device of an embodiment of the invention.
Figure 2:
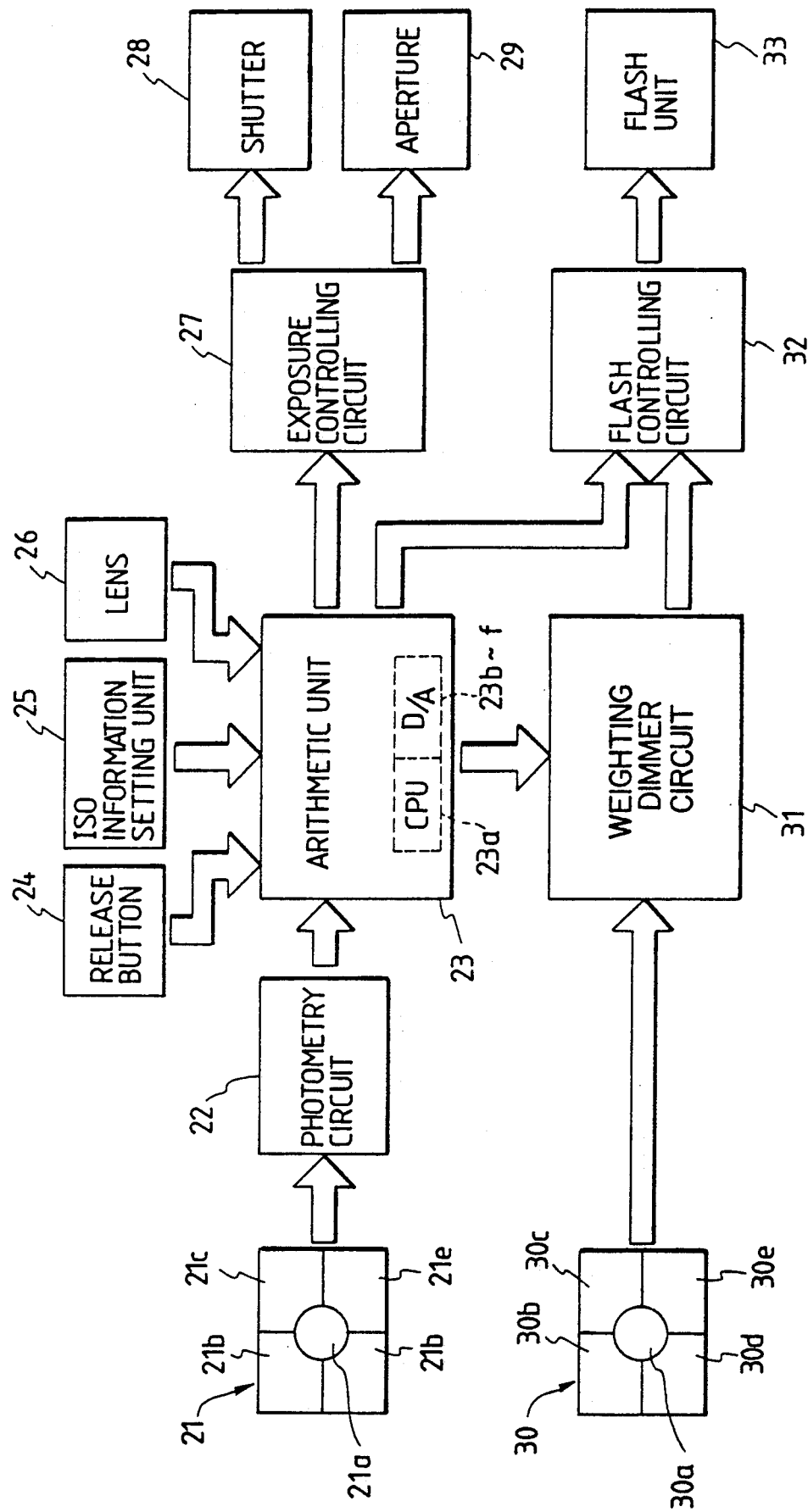
FIG. 2 is a block diagram illustrating the arrangement of an embodiment of the invention.

FIG. 1 is a cross section illustrating a diagrammatic arrangement of a single-lens reflex camera incorporating a device of an embodiment of the invention; FIG. 2 is a block diagram of a device of an embodiment of the invention.

In FIG. 1, a light of flux that passes through a camera lens 2 is reflected upwards by a movable mirror 4 in the lower position denoted by a dotted line in a camera body 1, and an image is formed on a focusing screen 5. A part of the light flux whose image is formed on the focusing screen 5 is conducted to a view finder lens 7 after passing through a pentaprism 6, and an object image formed on the focusing screen 5 is observed through the lens 7. The remainder the light flux whose image is formed on the focusing screen 5, is conducted to a first light-receiving element 9 forming as a first photometry means 21 shown in FIG. 2 via a condensing lens 8 and the pentaprism 6, as described in detail later. During photo-taking the movable mirror 4 is side-tracked at the upper position denoted by a solid line, light flux passing through camera lens 2, including reflected light from an object illuminated by the electronic flashing device 3 disposed on the upper part of the camera body 1, reaches a film surface 11 after passing through a shutter 10 during exposure operation. The electronic flash lighting device is so arranged that a part of the light flux that reaches the film surface 11 is reflected on the film surface 11, and reaches a second light-receiving element 13 forming a second photometry means 30 shown in FIG. 2 via a condensing lens 12.

In the block diagram of the camera of the invention shown in FIG. 2, a first photometry means 21, consisting of five light-receiving elements 21a to 21e, is so arranged that a field of flash unit 33 corresponding to the flashing device 3 in FIG. 1 is divided into five regions and measured during non-flash emission. The first photometry means 21 corresponds to the first light-receiving element 9 in FIG. 1. Each output of the photo-electric elements 21a to 21e of the first photometry means 21 logarithmically compressed by a photometry circuit 22 is sent to an arithmetic unit or calculation unit 23 for determining a weight, and is converted to a brightness value $BV_n$ (n = 1 to 5) respectively by using data such as an open aperture F value corresponding to the camera lens 2 in FIG. 1, etc. The exposure value of ambient light during non-flash of the flash unit 33 is calculated from the brightness value $BV_n$ (n = 1 to 5) and ISO film sensitivity data from an ISO information setting unit 25 by means of the calculation unit 23, and this value is sent to an exposure controlling circuit 27 for use with the control of a shutter 28 and an aperture 29 respectively corresponding to the shutter 10 and a variable aperture 14 in FIG. 1.

The second photometry means 30, consisting of photoelectric elements 30a to 30e, is so arranged that a field is divided into five regions and light measurement is performed during flash of the flash unit 33. This second photometry means 30 corresponds to the second light-receiving element 13. This second photometry means 30 is also located in such a way that the field divided by these five regions corresponds to the field divided by the five regions of the first photometry means 21. The calculation unit 23 calculates the degree of the weights of the five outputs of the second photometry means 30 from the brightness value $BV_n$ (n = 1 to 5) obtained from the first photometry means 21 in accordance with an algorithm described later with reference to FIG. 3, and converts the degree $D_n$ (n = 1 to 5, the n of $D_n$ corresponding to the n of $BV_n$) to a voltage value $E_n$ (n = 1 to 5).

For example, when strobo photo-taking is performed during daytime, and a release button 24 depressed, the calculation unit 23 controls the shutter 28 and the aperture 29 via the exposure controlling circuit 27, and causes the flash unit 33 to start flashing via the flash controlling circuit 32 when the shutter 28 is completely opened. The light flux from the flash unit 33 is reflected by an object, passes through a lens 26, and is divided and measured by the photoelectric elements 30a to 30e of the second photometry means 30 together with the ambient light, each output of which is sent to the weighting dimmer circuit 31. The weighting dimmer circuit 31 has been provided with the degree $D_n$ (n = 1 to 5) of the weights calculated from the field brightness $BV_n$ (n = 1 to 5) based on the light measurement outputs from the first photometry means 21 prior to a flash after the release operation. This is used to weight each output of the second photometry means 30. The outputs after the weighting are integrated, and when circuit 31 detects that the sum reaches a predetermined level, it outputs a stop signal to the flash unit 33 via the flash controlling circuit 32 to stop flashing.

Figure 3:
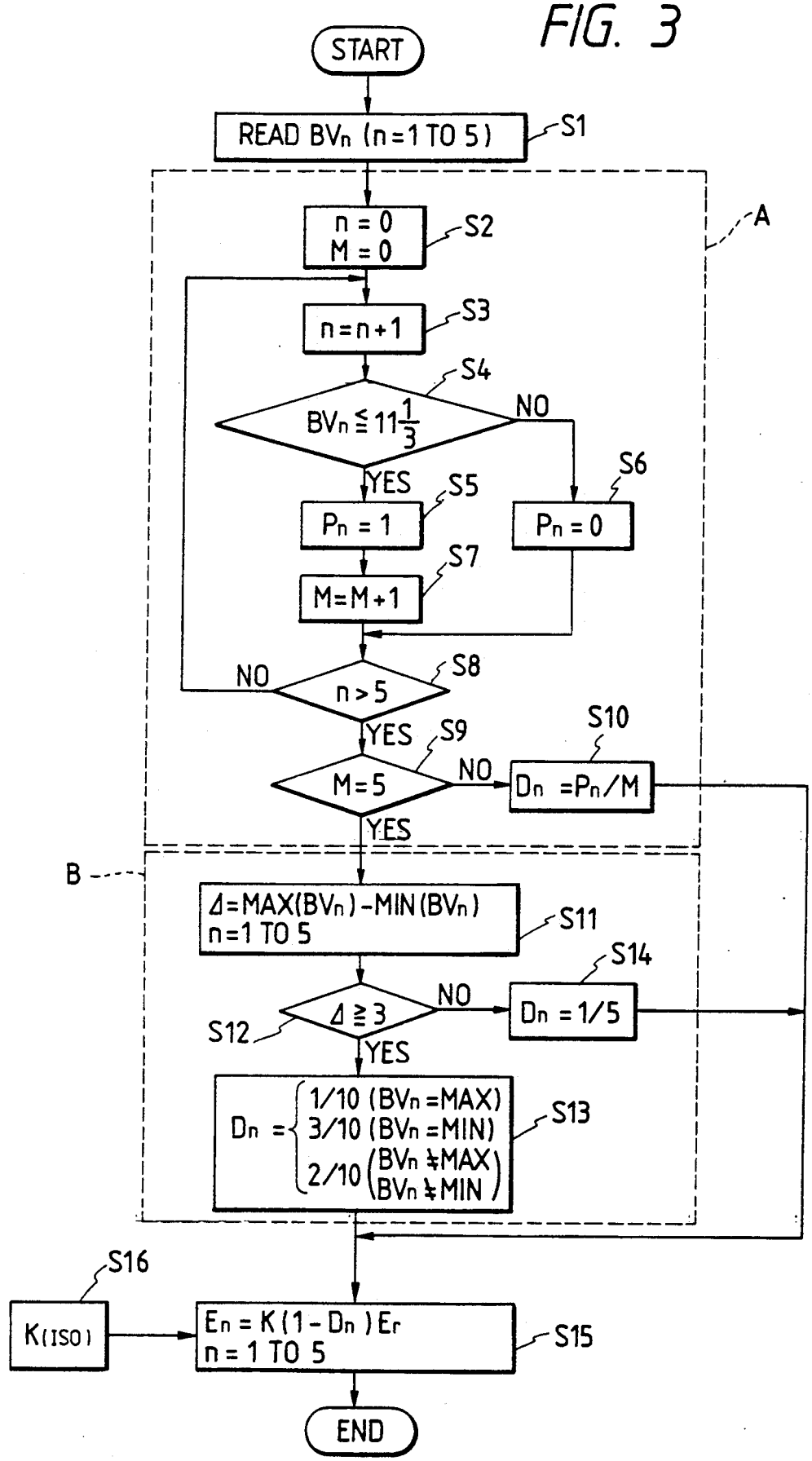
FIG. 3 is a flowchart flow chart of an algorithm executed in an arithmetic circuit in FIG. 2.

The part of algorithm that calculates the degree of weighting of the calculation unit 23 will now be described in FIG. 3, which is a flow chart is a flowchart for the algorithm executed in the calculation unit 23.

In step S1, five brightness values $BV_n$ (n = 1 to 5) obtained on the basis of detection outputs from the first photometry means 21 are read and the algorithm proceeds to an ultra-high brightness measure block A comprising steps S2 to S10. In step S2, the initial values of n and M are set to 0, and in step S3, the addition n = n + 1 is performed.

In step S4, $BV_n$ is compared with 11 ⅓ (BV). When $BV_n \leq 11⅓$ (BV), $P_n$ is set to 1, and in step 7, the addition M = M + 1 is performed. The M indicates the number of $BV_n$ not exceeding 11 ⅓ among the five $BV_n$ detected In step S4, when $BV_n < 11⅓$ (BV), $P_n$ is set to 0 in step S6, and the algorithm proceeds to step 8. And, in step S8, the routine of the above steps S3 to S8 is repeated until n exceeds 5, and when n exceeds 5, whether M = 5 or not is judged in step S9. In step 9, when M = 5, this indicates that there are no ultra-high brightness outputs that exceed 11 ⅓ (BV) among $BV_n$, and algorithm proceeds to the large brightness difference block B comprising steps S11 to S14.

In step S9, when M ≠ 5, this indicates that there are one or more ultra-high brightness outputs exceeding 11 ⅓ (BV) among $BV_n$. In this case, the algorithm proceeds to S10, where the degree of the weight $D_n$ is determined. In step S10, the calculation $D_n = P_n / M$ is performed, the result of which is $D_n = 0$ for a weight corresponding to a light measuring region that outputs an ultra-high brightness exceeding 11 ⅓ (BV), and $D_n = 1 /$ (number of regions not exceeding 11 ⅓ (BV)). This result is sent to step S15.

In the large brightness difference block B, in step S11 the maximum brightness difference $\Delta$ = MAX ($BV_n$) − MIN ($BV_n$) is calculated, and in step S12, the maximum brightness difference $\Delta$ and a prescribed value 3 are compared. In step 12, when $\Delta < 3$, that is, the maximum brightness difference $\Delta$ is smaller, the algorithm proceeds to step S14, where all of the five degrees of weighting are set to $D_n = 1/5$, this being sent to step S15. When $\Delta > 3$, that is, the maximum brightness difference $\Delta$ is larger, the algorithm proceeds to step S13, where the following is set, $D_n = 1/10$, where $D_n$ is the degree of weighting corresponding to the maximum brightness ($BV_n$ = max.) among the five outputs, $D_n = 3/10$, where $D_n$ is the degree of weighting corresponding to the minimum brightness ($BV_n$ = min.), and $D_n = 2/10$ where $D_n$ is the degree of weighting corresponding to the remaining three outputs, each of which is sent to step S15.

In step S15, a voltage value $E_n$ corresponding to the degree of the weighting of the previous steps 10, 13, and 14 is calculated in accordance with the equation $E_n = K(1 − D_n) E_r$, where K is a value that corresponds to ISO information set by the ISO information setting unit 25, and is input in step S16. The symbol $E_r$ is a prescribed voltage, and the details will be described with reference to FIG. 4.

Figure 4:
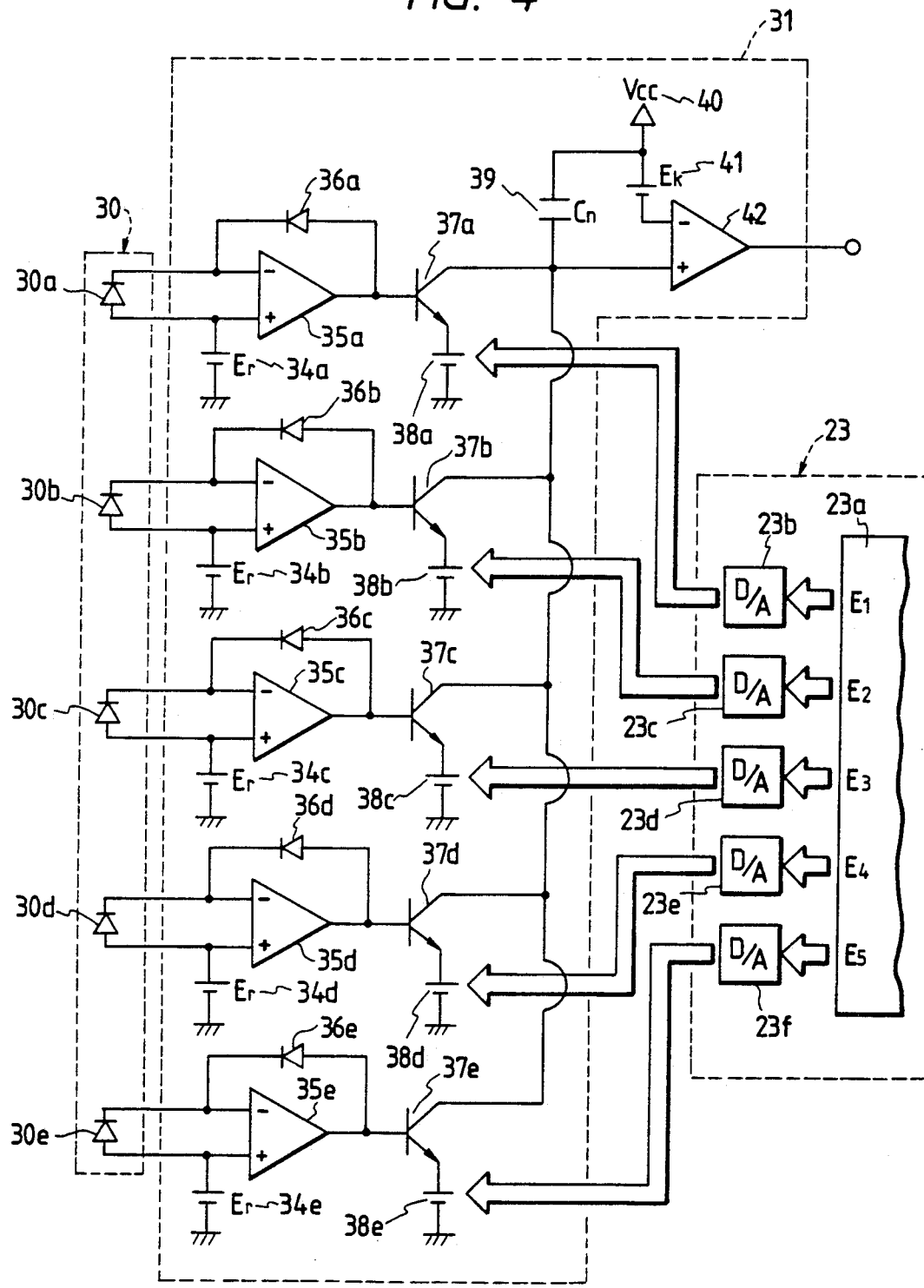
FIG. 4 is a circuit diagram illustrating the details of the weighting dimmer circuit in FIG. 2.

FIG. 4 is a circuit diagram illustrating the details of the weighting dimmer circuit 31.

When the five photoelectric elements (photo diodes) 30a to 30e forming the photometry means 30 are struck with light, an electric potential proportional to the amount of light is output from the operational amplifiers 35a to 35e, and applied to the bases of the transistors 37a to 37e. Then, a collector current flows from $V_{cc}$40 via a capacitor 39, the amount of which varies depending on the electric potential of the variable power supplies 38a to 38e. The electric potentials of these variable power supplies 38a to 38e are set from the voltage value $E_n$ output from the CPU part 23a of the above-described calcualtion unit 23 through D/A converters 23b to 23f. For example, when the photoelectric element 21a, part of the first photometry means 21, is ultra-highly bright exceeding BV = 11 ⅓, $D_1$ becomes 0 in step S10 in FIG. 3, and $E_1$ is set to a large value in step S15. Then, a collector current flowing to the transistor 37a becomes small, not aiding much in an accumulation of charges for the capacitor 39. A comparator 42 outputs a flash stop signal to the flash controlling circuit 32 when the potential at the (+) input side exceeds the reference potential at the (−) the collector current input side. The fact that does not aid much in the accumulation of charges for the capacitor 39 indicates that the output of the photodiode 30a of the second photometry means 30 is weighted low, and also indicates that an influence of ultra-high brightness is eliminated. As shown in FIG. 4, each of the photodiodes 30b to 30e is connected with a circuit the same as the circuit comprising of 34a to 38a for the photodiode 30a, and each circuit is connected to the capacitor 39 with the collectors of the trasnsistors 37a to 37e integrated. Therefore, the weighted outputs of the photodiodes aid in the accumulation of charges for the capacitor 39, determining decisively the timing of a flash stop signal.

Figure 5:
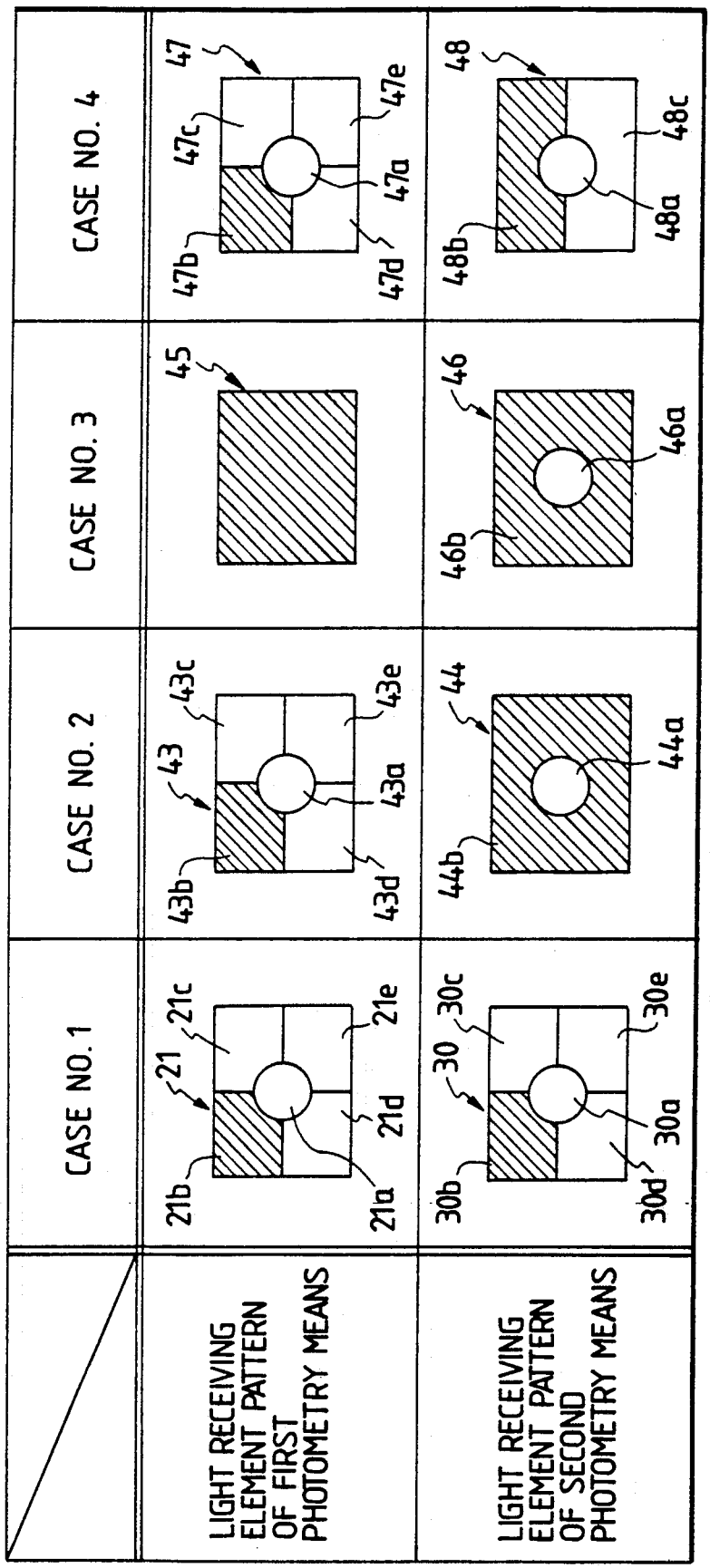
FIG. 5 is a diagram illustrating various combinations of light-receiving elements of the first photometry means and the second photometry means in FIG. 2.

FIG. 5 is a diagram showing examples of combinations of a pattern of a light-receiving element of the first and second photometry means. Case No. 1 indicates the same light-receiving element pattern as the embodiment shown in FIG. 2, and when the shaded portion 21b of the first photometry means 21 is an ultra-high brightness, the degree of weighting of the output of the shaded portion 30b of the second photometry means 30 corresponding to the portion 21b should be set low. In other words, it this indicates that the aid of the output of the photodiode 30b to the light control operation of the light control device 33 should be set low. The output of the photodiode 30b can also be stopped to eliminate the influence of the ultra-high brightness part of the shaded portion. Case No. 2 is an example in which the first photometry means 43 is of a five-division type, while the second photometry means 44 is of a two-division type, and only the central parts 43a and 44a correspond. In this case, when any of the peripheral parts (e.g., 43b) of the first photometry means is an ultra-high brightness, the degree of weighting of the entire peripheral area 44b of the second photometry means should be set low at light control time. Such a combination is useful when the light measuring optical system (for example, the lens 12) of the second photometry means 44 cannot divide a field very accurately.

Case No. 3 shows an example in which the first photometry means 45 is not a type that divides a field for measuring its brightness, and indicates that when the first photometry means 45 detects an ultra-high brightness, the degree of weighting of the peripheral area at which the probability of a main subject existing is low, should be set low.

Case No. 4 is an example in which the first photometry means 47 is of a five-division type, while the second light photometry means 48 is formed so as to be of a three-division type with center, upper and lower areas. This indicates that when the shaded portion denoted by 47b detects an ultra-high brightness, the degree of weighting of the entire peripheral upper side 48b should be set low. Such a combination is useful when the light measuring optical system of the second photometry means 48 sees a film surface from a very inclined position, or when a field can be divided accurately in upper and lower directions, but cannot be accurately divided in right and left directions.

The invention is not limited to the above described embodiments, and it goes without saying that various changes and modifications may be made in the invention without departing from the spirit and scope thereof. For example, when a single light measuring element is used for the second photometry means rather than a divided element for light measurement, a light control level of the weighting dimmer circuit 31 may be corrected on the basis of the output of the first photometry means. The brightness value $BV_n = 11\frac{1}{3}$ (BV) is used as a judgment value for judging whether there is an ultra-high brightness or not, but this value varies depending on photography conditions, so is not limited to $11\frac{1}{3}$ (BV).

As set forth hereinabove, light-receiving element patterns of the second photometry means are. divided, enabling a weighting for each area of the field. In a case where an input (light flux) that may exert an adverse influence on light control exists, it is illuminated at the stage of processing the light measurement output, or its weight is made small. However, weighting is made larger for an area in which a main subject is thought to exist. This makes possible light control capable of obtaining a proper amount of flash at all times.

Furthermore, since the flash time is very short, determination of weighting is performed in advance using the first photometry means before the start of a flash of a flashing means. Thus, in determining a weight, very complex calculations can be performed within a required time, and detail control is possible.

What is claimed is:

1. An electronic flash lighting device having flash producing means to produce a flash emission for lighting a field to be photographed, comprising:

first light measuring means for measuring the brightness of the field at a non-flash-emission time of said flash producing means and outputting a corresponding first light measurement output;

second light measuring means for measuring the brightness of a plurality of divided areas of the field during flash emission of said flash producing means and outputting a plurality of corresponding second light measurement signals;

determining means for determining weights for said plurality of second light measurement signals in accordance with said first light measurement output prior to the start of flash emission of said flash producing means;

weighting means for weighting said plurality of second light measurement signals in accordance with the weights determined by said determining means; and flash control means for controlling the stopping of flash emission of said flash producing means in accordance with the plurality of weighted second light measurement signals.

2. An electronic flash lighting device according to claim 1, further comprising integrating means for integrating each of the weighted second light measurement signals and producing corresponding integration signals for controlling said flash control means.

3. An electronic flash lighting device according to claim 2, wherein said integrating means determines a sum of said integration signals, and said flash control means stops the flash emission of said flash producing means when said sum reaches a predetermined value.

4. An electronic flash lighting device according to claim 1, wherein said first light measuring means measures the brightness of a plurality of light measurement divided areas of said field and produces a plurality of corresponding first light measurement signals as said first light measurement output.

5. An electronic flash lighting device according to claim 4, wherein said first light measuring means and said second light measuring means are so arranged that at least on divided area of said first light measuring means corresponds to at least one divided area of said second light measuring means.

6. An electronic flash lighting device according to claim 4, wherein each of said first light measuring means and said second light measuring means comprises a plurality of photoelectric elements disposed so as to divide said field into the same number of areas, including a central area and a peripheral area.

7. An electronic flash lighting device according to claim 4, wherein said first light measuring means includes a plurality of photoelectric elements disposed so as to divide said field into a central area and a plurality of peripheral areas, and said second light measuring means includes a plurality of photoelectric elements disposed so as to divide said field into two areas composed of a central area dn a peripheral area.

8. An electronic flash lighting device according to claim 4, wherein said first light measuring means includes a plurality of photoelectric elements disposed so as to divide said field into a central area and a plurality of peripheral areas, and said second light measuring means includes a plurality of photoelectric elements disposed so as to divide said field into three areas composed of a central area dn two peripheral areas.

9. An electronic flash lighting device according to claim 4, wherein said weighting means is arranged so as to minimize the effect of a second light measurement signal corresponding to a first light measurement signal with respect to a light measurement area having a brightness exceeding a predetermined value, and to provide the weighting of the other second light measurement signals in accordance with other of said first light measurement signals.

10. An electronic flash lighting device according to claim 4, wherein said determining means is arranged so as to compute a maximum brightness difference from said plurality of first light measurement signals, to determine equal weights for said plurality of second light measurement signals when said maximum brightness difference is equal to or less than a predetermined value, and to determine weights for said plurality of light measurement signals that are predetermined low, medium, or high values of maximum, minimum, or intermediate brightness values when said maximum brightness difference is equal to or more than said predetermined value.

11. An electronic flash lighting device according to claim 1, wherein said determining means includes a digital-to-analog converter, computes said weights digitally, and provides analog weights via said digital-to-analog converter.

12. An electronic flash lighting device according to claim 1, wherein said weighting means has an amplification and integration circuit for controlling the timing of stopping flash emission of said flash producing means by said flash control means in accordance with a total amount of integration of second light measurement signals amplified in proportion to weights determined by said determining means.

13. An electronic flash lighting device according to claim 1, wherein said first light measuring means includes a photoelectric element for measuring an average brightness of the entire field, said second light measuring means includes a plurality of photoelectric elements disposed so as to divide said field into two areas composed of a central area dn a peripheral area, said second light measurement signals being produced by the photoelectric elements of said second light measuring means, respectively, and said determing means determines a low weight for a second light measurement signal corresponding to a peripheral area of said second light measuring means when an output form said photoelectric element of said first light measuring means exceeds a predetermined flue designating ultra-high brightness.

14. An electronic flash lighting device according to claim 1, wherein said electronic flash lighting device is associated with a single-lens reflex camera, said first light measuring means is disposed within a finder of said camera for observing said field through a phototaking lens of said camera, and said second light measuring means is disposed in said camera to receive light from said field through said lens and reflected from the surface of a film in said camera.

* * * * *